June 30, 1970  W. L. STRICKLAND  3,517,555
RAIDO FREQUENCY HAZARD DETECTOR
Filed March 29, 1968
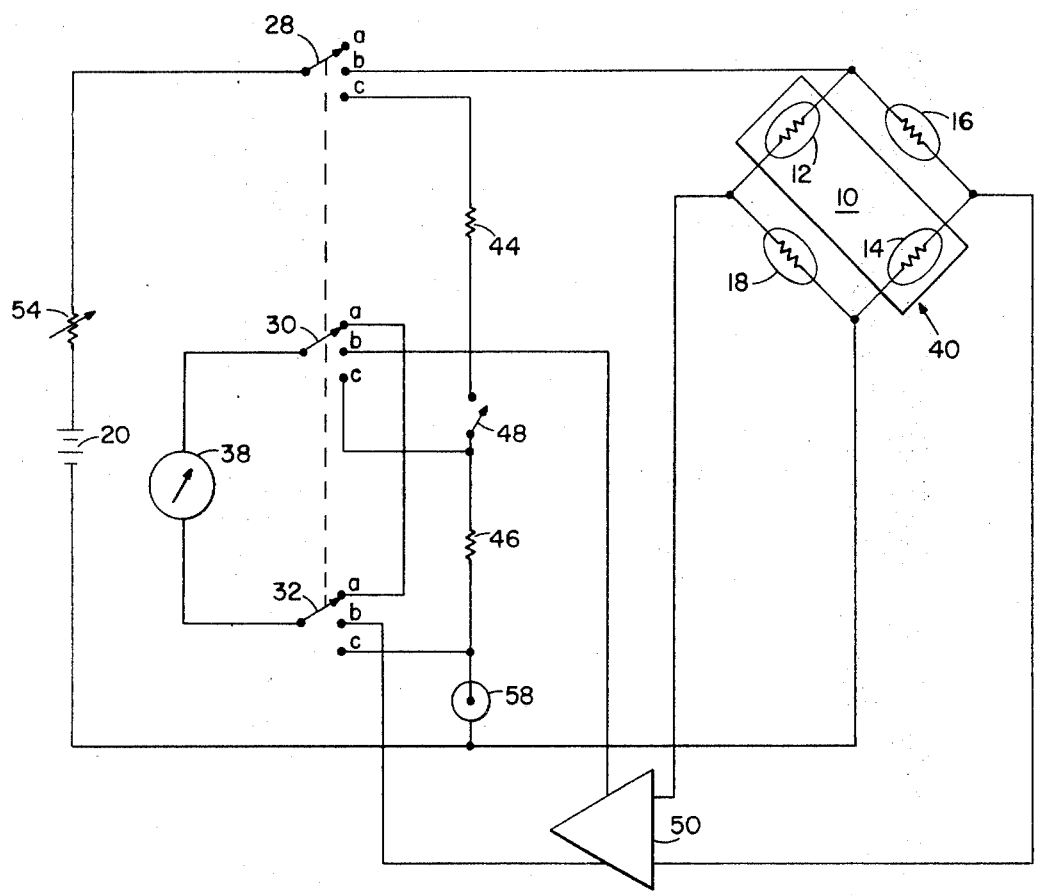
William L. Strickland,
INVENTOR.

3,517,555
RADIO FREQUENCY HAZARD DETECTOR
William L. Strickland, Huntsville, Ala., assignor to the United States of America as represented by the Secretary of the Army
Filed Mar. 29, 1968, Ser. No. 717,193
Int. Cl. G01k *3/08, 7/22*
U.S. Cl. 73—342                                    1 Claim

ABSTRACT OF THE DISCLOSURE

An apparatus for detecting dangerous ignition conditions in a rocket squib having a thermistor bridge network with two active thermistor detectors in opposite legs, two compensating thermistors in the other two legs, a voltage source connected across the bridge network and a current sensing device connected between the middle terminals of the bridge network. The two active thermistors are thermally linked with the rocket squib to detect any temperature change in the squib by recording a change of current in the current sensing device according to resistance change of the two active thermistors.

The invention described herein may be manufactured, used, and licensed by or for the Government for governmental purposes without the payment to me of any royalty thereon.

BACKGROUND OF THE INVENTION

Applicant's previous Pat. No. 3,091,965 discloses a means for detecting dangerous heating conditions in the squib bridgewire of a rocket igniter. An electrical bridge network having two thermistors in adjacent legs, and a fixed and a variable resistor in the other two legs opposite the thermistors, is utilized for detecting heating conditions in the squib. One thermistor is thermally linked with the squib bridgewire, and the second thermistor is thermally linked with ambient temperature. The variable resistor is used to bring the bridge network into equilibrium when the ambient temperature and the squib bridgewire temperature are different. A voltage source, connected across the bridge network, is utilized for furnishing a current through the two legs of the bridge network. A current sensing device, connected between the middle terminals of the bridge, senses any unbalance in the bridge network. The squib case is removed from the rocket igniter, for safety, before the test is started.

A signal of known frequency and power rating is applied to the squib bridgewire, and the resulting unbalanced bridge network current is recorded. Current will flow in direct proportion to the resistance drop in the heated thermistor that is thermally linked with the squib bridgewire. Various signals of known frequencies and power ratings are applied to the squib bridgewire, and the current through the current sensing device is recorded. A graph is constructed of radio frequency power versus current flow in the sensing device to determine the critical radiation that could possibly fire the squib.

Prior to connecting a firing harness to the squib bridgewire, a check of the intensity of stray radio frequency signals in the missile site area determines if their effect could possibly fire the rocket igniter prematurely.

A need for more sensitivity of the "Radio Frequency Hazard Detector" of the above noted patent was found to exist. The detector would tend to drift from initial conditions if an electric current from the current source was furnishing enough current for proper sensitivity. If the current was decreased, drift was reduced, but sensitivity was decreased also. It was found that an increase in current for the purpose of increasing sensitivity had an undesirable feature of heating the thermistor, thus lowering their resistance and causing more current flow.

SUMMARY OF THE INVENTION

This invention relates to an improved temperature measuring device in which two active thermistors are placed with one in each of the opposite legs of a thermistor bridge. The two active thermistors are thermally linked with the squib bridgewire and are physically positioned with one above and one below the squib bridgewire for better heat transfer characteristics. Two compensating thermistors are placed with one in each of the other two legs in the thermistor bridge. The sensitivity of the hazard detector is doubled by using two active thermistors, because with any increase in squib bridgewire temperature current will increase equally through both thermistors. An amplifier and a direct current sensing device are positioned across the middle terminals of the thermistor bridge to amplify and record the current change caused by any variation in the temperature of the squib bridgewire. The amplifier helps increase sensitivity without the undesired increase in current through the bridge network. Thus, a smaller change in temperature in the squib bridgewire can be recorded than was previously possible, and maintain a greater sensitivity without having the drift problem in the detector as before.

It is an object of this invention to provide a constant current temperature sensitive bridge network for detecting temperature change in a squib bridgewire.

It is a further object of this invention to provide a highly sensitive radio frequency hazard detector relatively unaffected by ambient temperature.

BRIEF DESCRIPTION OF THE DRAWING

The figure is a schematic diagram of the improved test circuit of a radio frequency hazard detector.

DESCRIPTION OF THE PREFERRED EMBODIMENT

Referring now to the preferred embodiment, numeral 10 designates a thermistor bridge network having two active thermistors 12 and 14 and two compensating thermistors 16 and 18. Active thermistors 12 and 14 are located in electrically opposite legs of the thermistor bridge network and are thermally linked with a squib bridgewire (not shown) in squib 40. Compensating thermistors 16 and 18 are located outside the squib and in the other two electrical legs of the bridge network. The compensating thermistors are insulated in an expanded cellular polystyrene, such as Styrofoam, or some other good insulator, so that any change in the ambient temperature will not affect their resistance. The compensating thermistors are utilized to balance the bridge network before applying radio frequency signals to the squib bridgewire. Radio frequency signals, applied to the squib bridgewire, cause a rise in temperature that is transferred to the thermally linked active thermistors 12 and 14. A D-C voltage source 20 is connected in series with a variable resistor 54 to form a current source. The source is connected across thermistor bridge network 10 for furnishing an electrical current to the two legs of the bridge network. A D-C amplifier 50 and a D-C sensing device 38, such as an ammeter or a strip chart recorder, are connected across the middle terminals of thermistor bridge network 10 for recording any unbalance in the bridge network.

Thermistors 12 and 14 are thermally coupled to the squib bridgewire under test, with one positioned above and the the other positioned below the bridgewire for optimum heat transfer characteristics. Thermistor bridge 10 is a temperature sensitive device that converts any temperature change in the environment of the two active thermistors 12 and 14 into a proportional change in current flow in sensing device 38. Voltage source 20 generates a current through variable resistor 54 that is applied to the thermistor bridge. This current is supplied to the bridge at a junction between active thermistor 12 and compensating thermistor 16 and flows out at a junction between active thermistor 14 and compensating thermistor 18. The middle terminals of thermistor bridge 10 are connected to D-C amplifier 50. Any current unbalance in the two legs of the thermistor bridge, caused by a temperature change in the active thermistors, will be amplified by amplifier 50 and fed to D-C sensing device 38.

More sensitivity is possible by using two thermistors and the current amplifier than by using one active thermistor and no amplifier as in prior art radio frequency hazard detectors. The critical radio frequency radiation is determined by accurate control of radio frequency transmitters radiating signals into the squib bridgewire. A chart showing the limit of radio frequency power that the squib bridgewire could take before heating to firing temperature may be prepared. The chart may be used to determine if any radiation, found at the launch site, would be critical if the firing harness were connected to the rocket igniter. Thermistor bridge 10 is insulated so that the ambient temperature of all four thermistors 12, 14, 16 and 18 will remain constant until a current is sent through the squib bridgewire to heat active thermistors 12 and 14. Compensating thermistors 16 and 18 are thermally isolated from the environment of the squib bridgewire and active thermistors 12 and 14, providing even greater accuracy. Thus, only a firing current from the launch crew, or stray radio frequency currents, would cause an unbalance in the thermistor bridge. An operator monitoring the current in the D-C sensing device 38, keeps a constant check on any dangerous radio frequency radiation just prior to launching the rocket.

Switches 28, 30, and 32 are single pole three throw devices, each having switch positions *a*, *b*, and *c* and corresponding terminals. These switches are mechanically linked through their throw arms. When the throw arms are in the *a* position as shown in FIG. 1, the hazard detector is "off" and D-C sensing device 38 is shorted to avoid any damage in moving.

Position *b* of switches 28, 30 and 32 is the "on" position. The switches are in position *b* when the hazard detector is located inside the squib prior to launching of the rocket. Position *c* of switches 28, 30 and 32 is the test position and is used to test for continuity of the squib bridgewire. When the switches are in position *c* the circuit is a series combination of voltage source 20, variable resistor 54, resistor 44, push-button 48, and the parallel combination of D-C sensing device 38 and resistor 46, and through coaxial connector 58 that is also connected to the squib bridgewire under test. When push-button 48 is pressed, a voltage from voltage source 20 is applied to the squib bridgewire through coaxial connector 58 and a voltage will be developed across resistor 46 and D-C sensing device 38 if there is continuity in the squib bridgewire.

While a specific embodiment of the invention has been shown and described other embodiments may be obvious to one skilled in the art, in light of this disclosure.

I claim:

1. A rocket igniter dangerous condition detector comprising a thermistor bridge having first and second active thermistors and first and second compensating thermistors, wherein said first and second active thermistors are positioned in opposite legs of said thermistor bridge and adapted to be positioned in proximity of a rocket igniter squib bridgewire with said first and second compensating thermistors positioned in opposite legs and adjacent said active thermistors, each thermistor having a first and a second terminal, a current source connected across said thermistor bridge for supplying an electic current thereto, said current souce including a direct current voltage source having first and second terminals and an adjustable resistance having first and second terminals, a direct current amplifier having a first and a second input terminal and a first and a second output terminal, a direct current sensing device connected across said thermistor bridge for detecting any resistance unbalance in said first and second active thermistors when compared to said first and second compensating thermistors whereby current from said current source will flow easier through said first and second active thermistors when heated by said squib bridgewire to thus cause unbalancing of said bridge and current flow through said current sensing device, said direct current sensing device having a first and a second terminal, said first terminal of said first active thermistor connected to said first terminal of said first compensating thermistor, said second terminal of said first active thermistor connected to said first input terminal of said amplifier, with said second terminal of said first compensating thermistor connected to said second input terminal of said amplifier, said first terminal of said second active thermistor connected to said second terminal of said first compensating thermistor, and said first terminal of said second compensating thermistor connected to said second terminal of said first active thermistor, said second terminal of said second compensating thermistor connected to said second terminal of said second active thermistor, a three throw switching means for connecting and disconnecting electric current to said thermistor bridge and to said current sensing device, said three throw switch further including a push button switch having first and second terminals, a three throw switch having first, second and third switches, each switch of said three throw switch comprising a movable contact and first, second and third fixed contacts, a first and second resistance, each having a first and a second terminal, and a coaxial connector, the movable contact of said first switch of said three throw switch being connected to a first terminal of said adjustable resistance, the movable contact of said second switch being connected to said first terminal of said sensing device, the movable contact of said third switch being connected to a second terminal of said sensing device, said first contact of said first switch being isolated, said first fixed contacts of said second switch and said third switch of said three throw switch being shorted together, said second fixed contact of said first switch being connected to the junction of said first terminals of said first active thermistor and said first compensating thermistor, said second fixed contact of said second switch being connected to said first output terminal of said amplifier, said second fixed contact of said third switch being connected to said second output terminal of said amplifier, said third fixed contact of said first switch being connected to said first terminal of said first resistance, with said second terminal of said first resistance being connected to said first terminal of said push button switch, said third fixed contact of said second switch being connected to the junction of said second terminal of said push button switch and said first terminal of said second resistance, said third fixed contact of said third switch being connected to a junction of a second terminal of said second resistance and to one conductor of said coaxial connector, with a second conductor of said coaxial connector connected to the junction of said second terminals of said second active thermistor and said second compensating thermistor, said second terminal of said variable resistance connected to said first terminal of said direct current voltage source, and said second terminal of said direct current voltage source connected to the junction of said second terminals of said second active thermistor and said second compensating thermistor.

References Cited

UNITED STATES PATENTS

| | | | |
|---|---|---|---|
| 1,099,199 | 6/1914 | Parker | 73—342 |
| 3,091,965 | 6/1963 | Strickland | 73—362 |
| 3,295,353 | 1/1967 | Hagen | 73—362 |

LOUIS R. PRINCE, Primary Examiner

D. E. CORR, Assistant Examiner